United States Patent [19]

Matsumoto

[11] 4,061,953

[45] Dec. 6, 1977

[54] NUMERICAL CONTROL SYSTEM

[75] Inventor: Mitsuo Matsumoto, Kokubunji, Japan

[73] Assignee: Tokyo Shibaura Electric Co., Ltd., Kawasaki, Japan

[21] Appl. No.: 692,347

[22] Filed: June 3, 1976

[51] Int. Cl.² .............................................. G05B 19/24
[52] U.S. Cl. ..................................... 318/573; 318/603
[58] Field of Search ................................ 318/603, 573; 235/151.11

[56] References Cited

U.S. PATENT DOCUMENTS

| | | | |
|---|---|---|---|
| 3,370,289 | 2/1968 | Hedgcock et al. | 318/603 X |
| 3,569,814 | 3/1971 | Rosenberg | 235/151.11 X |

*Primary Examiner*—Eugene G. Botz
*Attorney, Agent, or Firm*—Oblon, Fisher, Spivak, McClelland & Maier

[57] ABSTRACT

A numerical control system comprises a machine tool having two axially movable sections, a tape reader for instructing a movement path of the movable section, a sampling pulse generator for generating a pulse for each predetermined time period, a position detector for detecting the amount of movement of the movable section for each sampling time, a controller for calculating an instruction position increment value corresponding to the movement for the predetermined time period of the movable section of the machine tool based on a data from the tape reader, the sampling pulse from the sampling pulse generator and a position data from the position detector, a digital-analog converter for converting a digital output of the controller to an analog value, a servo amplifier for amplifying the output of the digital-analog converter and a servo motor driven by the output of the servo amplifier. The servo motor is driven according to the instruction position increment value outputted from the controller and a workpiece is machined along an instruction movement path based on a straight line instruction, circular arc instruction, or positioning instruction.

11 Claims, 13 Drawing Figures

NUMERICAL CONTROL SYSTEM

BACKGROUND OF THE INVENTION

This invention relates to a numerical control (NC) system for a machine tool and in particular to a numerical control system capable of effecting the numerical control of the machine tool by a computer or a wire-connected controller and capable of effecting the numerical control of the machine tool by directly controlling a servo motor for moving the tool.

In a conventional NC system an interpolating device in a hardware performs an interpolating function such as a straight line interpolation, circular arc interpolation etc. A now available NC system is required to produce a maximum interpolating speed of more than 200,000 unit instruction pulses per second and in consequence a high speed interpolating device is required to meet the requirement, making it difficult to its realization. If on the other hand an interpolating function per unit pulse is executed using a computer, the computer must calculate and transfer an interpolating data per 5 $\mu$sec, thus largely exceeding the processing capablity of the general-purpose computer and making it impossible for the computer to have such a processing speed.

To attain an excellent servo chracteristic a speed control loop is provided in which a motor speed voltage is fed back through a minor loop by a tachometer generator connected to the motor. However, it is desirable that the tachometer generator be disposed from the standpoint of economy and reliability.

SUMMARY OF THE INVENTION

It is accordingly the object of this invention to provide an NC system for a machine tool which is capable of performing an interpolating function even at a maximum interpolating speed by a general purpose computer or a wire-connected controller and capable of directly controlling through a servo amplifier a servo motor for moving the machine tool.

The invention is based on the consideration that a now available quickest-response servo motor is of the order of about 100Hz. If a servo motor is sampling-controlled with a response speed of more than 100Hz, it is possible to obtain a servo characteristic the same as a continuous control.

According to one embodiment of this invention there is provided an NC system comprising a plurality of axially movable sections; a numerical data source for instructing as a numerical data a predetermined movement path to the movable section; position detecting means for detecting an amount and direction of movement of the movable section for each predetermined time period to generate a position data; and a controller adapted to calculate an instruction position increment value of the movable section to be moved for each predetermined time period based on the numerical data from the numerical data source, sampling pulse from the sampling pulse generator and position data of the movable section as detected from the position detecting means. In this NC system it is sufficient if the instruction position increment value is calculated only once for transfer. This largely alleviates a burden imposed on the NC system.

In another aspect of this invention the NC system includes a fractional part processing circuit adapted to separate each position instruction increment value into fractional and integral parts and carry the position instruction increment value as an integral value and a final sampling processing circuit for delivering at a final sampling time an instruction position increment value finally coincident with an instruction data in which an instruction mode such as a straight line mode, circular arc mode, positioning mode etc. can be reliably executed in an accurate way.

According to another embodiment of this invention an NC system comprises a controller for delivering a motor drive output data for each predetermined time period, a digital phase converter for converting a motor drive data from the controller to a phase data proportional to the motor drive data and a servo amplifier for controlling a conduction angle for every predetermined time period, thus obviating the necessity of providing a tachometer generator by directly controlling the conduction angle of SCR's in a servo amplifier and attaining an excellent servo characteristic. As a result, the NC system is excellent from the standpoint of economy and reliability.

DETAILED DESCRIPTION OF THE PREFERRED EMBODIMENTS

Figure 1:
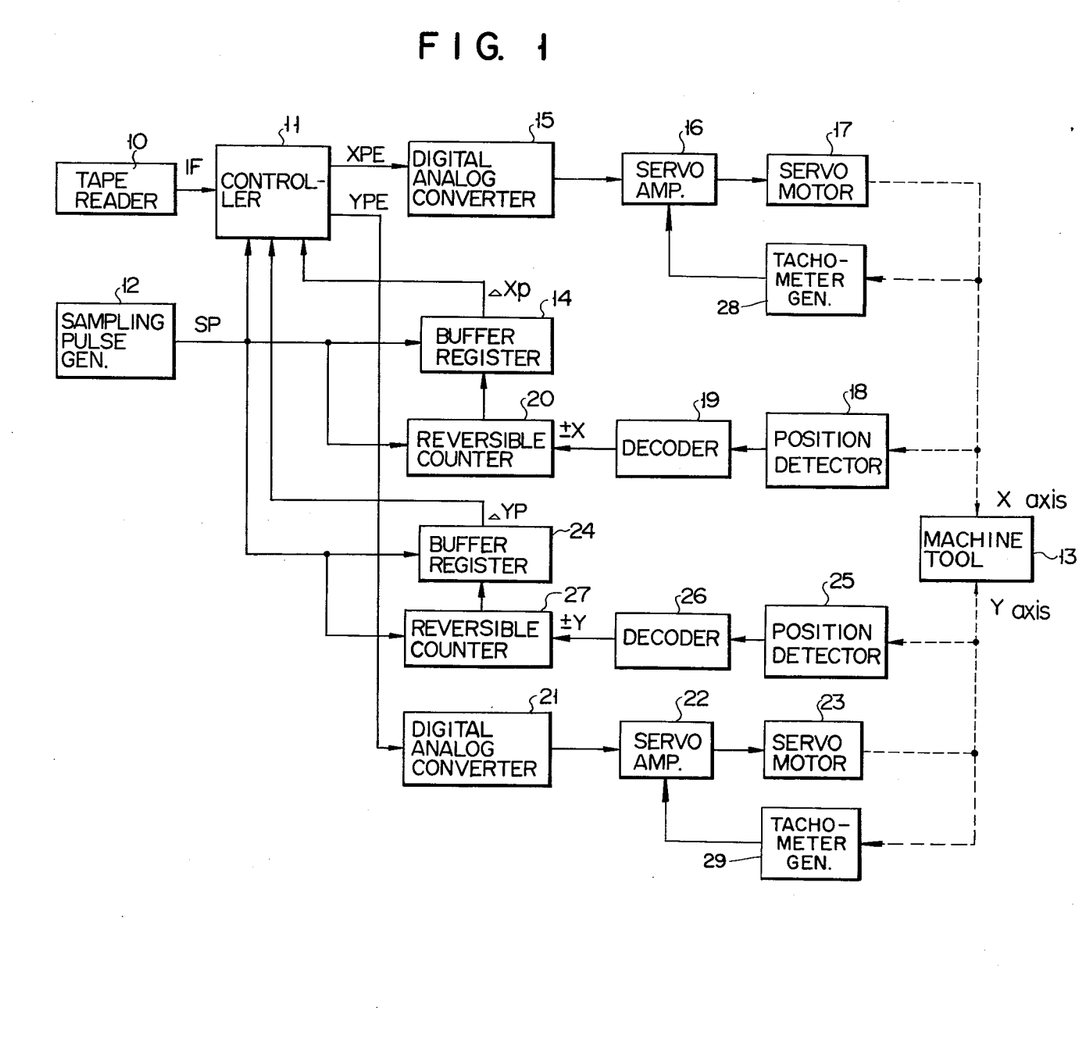
FIG. 1 is a block diagram showing an NC system according to one embodiment of this invention.

FIG. 1 shows a NC system used in connection with a 2-axis machine tool. A tape reader 10 reads, for example, an NC tape, on which a data IF for instructing a cutting path of a machine tool 13 is punched, and sends the data IF to a controller 11. The controller 11 is adapted to calculate an increment value corresponding to a position for the machine to be moved for every predetermined time and deliver an output. That is, the controller 11 is adapted to calculate an instruction position increment value corresponding to an intended axial movement of the machine tool to be effected for a sampling time ($\Delta t = $1ms), based on the data IF read at the tape reader 10 and a sampling time signal SP generated for every sampling time ($\Delta t = $1ms) from a sampling pulse generator 12, and to receive from a buffer register 14 a data corresponding to an actual X-axis position taken by the machine tool and deliver a position error output XPE, i.e. a difference between the instruction position and the actual position of the machine tool. The output of the position error output is converted at an X-axis digital-analog converter 15 from a digital to an analog value. An analog voltage corresponding to the position error XPE is fed through a servo amplifier 16 to a servo motor 17. The machine tool is moved in the X-axis direction by the rotation of the servo motor. A pulse generating position detector 18 is mechanically mounted on the servo motor 17 and delivers a pulse each time the machine tool is moved in unit distances. Each pulse is delivered through a decoder 19 to a reversible counter 20 where it is counted, and the counted value is stored as the position data of the machine tool 13 in the buffer register 14. Although explanation has been made about the X-axis mechanical elements, Y-axis mechanical elements 21 to 27 perform the same operation. FIG. 1 explained in detail:

Each time a machine movable section is moved in unit distances along the X-axis, the position detector 18 generates two output pulses having a 90° phase difference with respect to each other according to the moving direction and the position detector 18 is comprised of a known means, for example, a pulse encorder etc. When the output pulse is delivered to the decoder 19, the decoder 19 delivers a plus X pulse when the machine movable section is moved in the positive direction and a minus pulse when the machine movable section is moved in the negative direction. The reversible counter 20 has "1" added to the content thereof upon receipt of the plus X pulse and "1" subtracted from the content thereof upon receipt of the minus X pulse. It is desired that the counting capacity of the reversible counter 20 exceed the maximum number of plus and minus pulses generated during one sampling time period. The content of the reversible counter 20 in FIG. 1 is cleared to "0" for each sampling time to permit the plus and minus pulses from the decoder 19 to be counted and at the next sampling time the count value of the reversible counter 20 is stored in the buffer register 14 so that the reversible counter 20 can be clear to "0". By so doing the content of the buffer register 14 can represent the X-axis movement distance taken by the machine tool 13 during the sampling time.

Figure 2:
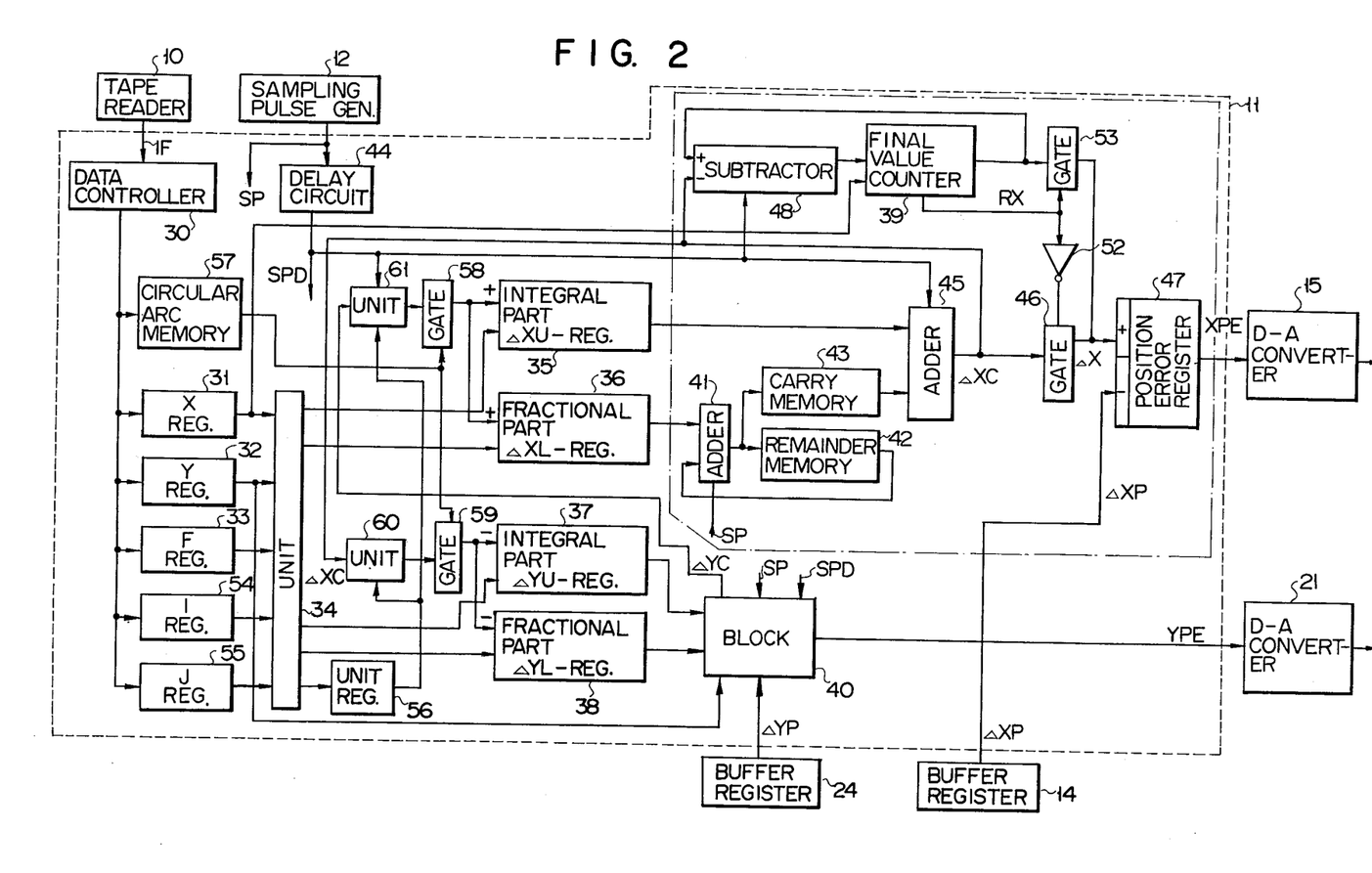
FIG. 2 is a block diagram showing a detail of a controller in FIG. 1.

FIG. 2 shows a block diagram for explaining more in detal the inner arrangement of the controller 11 in FIG. 1. In the Figure the instruction data IF read by the tape reader 10 is decoded at a data controller 30.

a. Suppose that a straight line with X and Y representing X- and Y-axis movement distances, respectively, of the machine movable section (the corresponding numerical values are represented by unit pulses — for example, a 1 pulse is expressed by 1 μm) is instructed and that the data of a feed speed at this time is represented by F pulse/sec. This instruction data is usually punched on the NC tape and when the NC tape is read by the reader 10 the data controller 30 delivers a data "X" to an X register 31, a data "Y" to the Y register 32 and a speed data "F" to an F register 33. These data are stored in the respective register. A unit 34 calculates the instruction positon increment values ΔX and ΔY during each sampling time based on these data as indicated in the following expression (1).

$$\Delta X = F \frac{X}{\sqrt{X^2 + Y^2}} \Delta T \text{ (pulse)}$$

$$\Delta Y = F \frac{Y}{\sqrt{X^2 + Y^2}} \Delta T \text{ (pulse)} \quad (1)$$

This instruction position increment values ΔX and ΔY are usually values including a fractional part representing a value less than 1 pulse. According to this invention, therefore, a logic circuit for processing fractional values is provided. $\Delta X_u$ represents a value greater than the decimal point of ΔX and $\Delta X_L$ a value less than the decimal point of ΔX, whereas $\Delta Y_u$ represents a value greater than the decimal point of ΔY and $\Delta Y_L$ a value less than the decimal value of ΔY. The value $\Delta X_u$ is stored in an integral part $\Delta X_u$ register 35; the value $\Delta X_L$, in a fractional part $\Delta X_L$ register 36; $\Delta Y_u$, in an integral part $\Delta Y_u$ register 37; and $\Delta Y_L$, in a fractional part $\Delta Y_L$ register 38. A data X in the X register 31 is stored in an X final value counter 39 and a data Y in the Y register 32 in a Y final value counter (not shown) in a block 40 to be later described. The above-mentioned preparing action is effected only once when such a straight line instruction is issued.

In the case of a circular arc instruction the above-mentioned $\Delta X_u$ register 35, $\Delta X_L$ register 36, $\Delta Y_u$ register 37 and $\Delta X_L$ register 38 act as addition/subtraction registers. Since the X- and Y-axis movements are entirely identical to each other, only the X-axis movement will be explained below.

After the preparing action is complete, the value $\Delta X_L$ in the fractional part register 36 and a comulative fractional value in a remainder memory 42 are added together at an adder 41 by a SP pulse generated for each sampling time from the sampling pulse generator 12. As a result of addition, a carry overflowed from the fractional part is stored in a carry memory 43 and the remainder, i.e., a value less than the decimal point is stored in the remainder memory 42. A delay circuit 44 delivers upon receipt of the sampling pulse SP a pulse SPD delayed a certain time from the SP pulse, and an adder 45 is adapted to add together the value $\Delta X_u$ in the integral part register 35 and the carry data in the carry memory 43 upon receipt of the SPD pulse to deliver an output $\Delta X_c$ representative of a position instruction increment value associated only with the integral part. Each position instruction increment value $\Delta X_c$ is sequentially applied through a normally open gate 46 to a position error register 47. In consequence, each instruction position increment value $\Delta X_c$ is added for each sampling time ΔT to the position error register 47. At the same time, a subtractor 48 subtracts upon receipt of the SPD pulse the instruction position increment value $\Delta X_c$ from the data stored in the X final value counter 39. The subtracted value is stored in the X final value counter 39.

On the other hand, at the sampling time SP the data ΔXp in the buffer register 14, which represents the X-axis movement distance taken by the machine movable section for each sampling time ΔT, is delivered at the substraction side of the position error register 47. The position error register 47 subtracts for each sampling time the value ΔXp from the cumulative value of the instruction position increment value $\Delta X_c$ which is derived from the integral part only. The value ΔXp denotes the X-axis movement distance taken by the machine tool during each sampling time.

As mentioned above, the position error register 47 effects a cumulative addition of each instruction position increment value for each sampling time and effects a cumulative subtraction of the movement distance ΔXp taken by the machine tool 13 for each sampling time. In consequence, the position error register 47 represents a position error, i.e., a difference between the instruction position and the actual position of the machine tool. With XPE representing an output signal of the position error register 47 the signal XPE is applied to the D-A converter 15 where it is converted to an analog signal. The analog signal is delivered through the servo amplifier 16 to the servo motor 17 to cause the latter to be driven to permit the machine tool 13 to be moved in the X-axis direction.

Figure 3A:
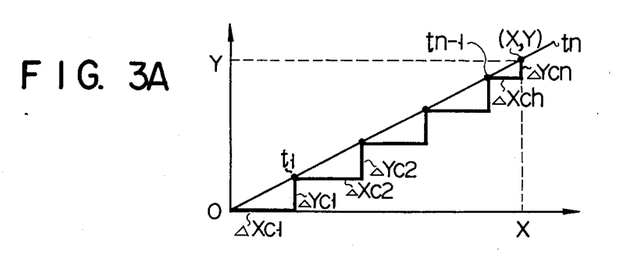
FIGS. 3A to 3C are path diagram showing a straight line instruction, circular arc instruction and positioning instruction, respectively.
Figure 3B:
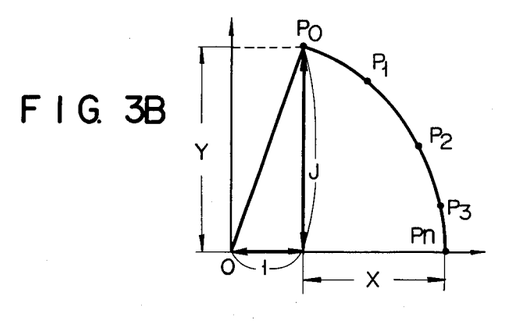

When the instruction position increment values $\Delta X_c$ and $\Delta Y_c$ are cummulatively added for each sampling time to the position error register 47 as shown in FIG. 3A and such a cummulative addition is effected at the $n$-th sampling time ($tn$), the cumulative addition result exceeds a final value X. For this reason, the NC system is provided with a circuit for effecting a final sampling processing. That is, at the $n$-th final sampling time the X final value counter 39 effects a sign inversion. A sign-inverted detection signal RX is applied through an inverter 52 to the normally open gate 46 to cause the latter to be closed and it is also applied to a gate 53, causing the latter to be opened to permit an addition to the position error register 47 of the content stored in the X final value counter 39, i.e., a value $$(X - \sum_{n=1}^{n=n-1} \Delta XC_n)$$

taken immediately before the subtraction of the data $\Delta XC$ at the $n$-th sampling time ($t_n$) from the X final value counter 39. As a result, the instruction position data "X, Y" as shown in FIG. 3A can be accurately executed. Although explanation has been made in connection with the X-axis movement, the same thing can also said of the Y-axis movement and no further explanation will be made. The block 40 has the same arrangement as that enclosed by a dash dot line in FIG. 2. In this way, the machining of the machine tool 13 with respect to workpiece is effected based on the straight line instruction as shown in FIG. 3A.

b. Suppose that a circular arc instruction, as shown in FIG. 3B, with "X, Y" representing a movement distances of the arc and "I, J" representing the center distance of the circle is given at a rate of speed "F" to the NC system through the tape reader 10. In the case of the circular arc instruction the instruction position increment values $\Delta X$ and $\Delta Y$ at the starting point "$P_0$" during the sampling time will be given below:

$$\Delta X = F \frac{J}{\sqrt{I^2 + J^2}} \Delta T \text{ (pulse)}$$

$$\Delta Y = F \frac{-I}{\sqrt{I^2 + J^2}} \Delta T \text{ (pulse)} \quad (2)$$

The instruction position increment values $\Delta X$ and $\Delta Y$ are calculated, through the use of an equation (2), based on the instruction data "I, J" in the registers 54 and 55 and the speed data "F". Like the straight line instruction (a), the integral parts $\Delta X_u$ and $\Delta Y_u$ of the instruction position increment values $\Delta X$ and $\Delta Y$ are stored in the integral part registers 35 and 37 and the fractional parts $\Delta X_L$ and $\Delta Y_L$ of the increment values $\Delta X$ and $\Delta Y$ are stored in the fractional part registers 36 and 38. A constant $F\Delta T\sqrt{I^2+J^2}$ calculated at the unit 34 is stored in the unit register 56. The instruction data "X" is stored in the X final value counter 39 and the instruction data "Y" is stored in the Y final value counter not shown.

Figure 3C:
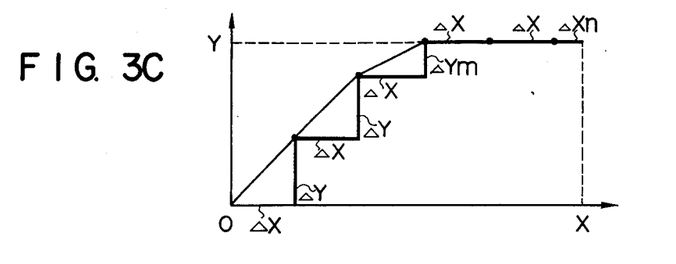

In the circuit arrangement in FIG. 2 the NC system is operated, like the straight line instruction, for each sampling time. The circular arc instruction is different from the straight line instruction in that when the circular instruction is issued a circular arc memory 57 is set to cause gates 58 and 59, which are closed in the straight line instruction, to be opened. When the instruction position increment value $\Delta X_c$ associated with the integral part only is outputted from the adder 45 for each sampling time, a calculating unit 60 calculates a quantity $F \cdot (\Delta Xc/\sqrt{I^2+J^2}) \cdot \Delta T$ obtained by multiplying the value $\Delta X_c$ by a constant $(F\Delta T/\sqrt{I^2+J^2})$ stored in the unit register 56. The calculated value is separated into integral and fractional parts which are, respectively, sent through the gate 59 to the integral and fractional part registers 37 and 38 where the calculated value is subtracted from the values $\Delta Y_u$ and $\Delta Y_L$ of the registers 37 and 38. When the block 40 delivers a Y-axis instruction position increment value $\Delta Y_c$, a calculating unit 61 calculates a quantity $F \cdot (\Delta Yc/\sqrt{I^2+J^2}) \cdot \Delta T$ obtained by multiplying the $\Delta Y_c$ by a constant stored in a unit register 56. The calculated value is separated into integral and fractional parts which are added through the gate 58 to the values $\Delta X_u$ and $\Delta X_L$ in the integral parts register 35 and fractional part register 36, respectively. As set out above, in the case of the circular arc instruction the circular arc position increment value from the circular arc starting point corresponding to each sampling time is stored in the registers 35 to 38 which function as addition/subtraction registers. Since X- and Y-axis instruction position increment values $\Delta X$ and $\Delta Y$ vary for each sampling time, a circular arc traced by the points $P_0, P_1, P_2 ... P_n$ is formed as shown in FIG. 3B and when the cummulated values of the final value counter 39 completes the instruction data "X, Y" the circular arc instruction is completely executed. The other action of the circular arc instruction is similar to the corresponding action of the straight line instruction.

c. Suppose that a positioning instruction is given by the NC system (FIG. 3C). When in this case the instruction position increment values $\Delta X$ and $\Delta Y$ are made at a constant value for each sampling time and the same operation as in the case of the straight line instruction is effected, positioning can be completed with $\Delta X_n$ as a value in the X-axis direction and $\Delta Y_m$ as a value in the Y-axis direction.

The NC system in FIG. 1 is such that the controller calculates the position error of the X- and Y-axis direction based on each instruction corresponding to each sampling time to cause the machine tool to be moved according to the instruction. To obtain a better servo characteristic, however, it is necessary to provide a minor-loop for feeding a speed generator signals back to the servo amplifier 16 by a tachometer generator. That is, a tachometer generator 28 is provided on the motor shaft corresponding to the X-axis and a tachometer generator 29 is provided on the motor shaft corresponding to the Y-axis respectively. The tachometer 28 detects the revolution number of servomotor 17 to generate an output signal which in turn is supplied to the servo amplifier 16. The tachometer 29 detects the revolution number of servomotor 23 to generate an output signal which in turn is supplied to the servo amplifier 22. However, it is desired that the tachometer generator be dispensed with from the standpoint of economy and reliability.

Figure 4:
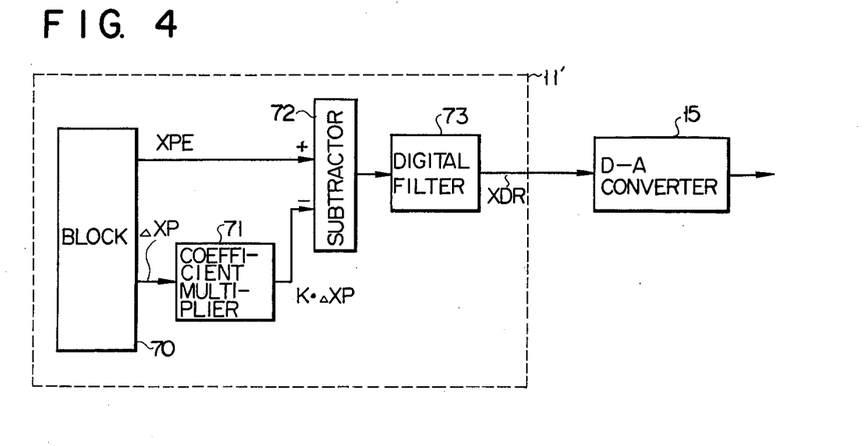
FIG. 4 is a block diagram of a controller according to another embodiment of this invention.

FIG. 4 shows an NC system according to another embodiment of this invention. This system dispenses with the tachometer generators 28, 29 shown in FIG. 1 and can attain excellent servo characteristic. In the system in FIG. 1 the output of the controller 11 indicates the position error, but the system in FIG. 4 shows a speed error XDR instead. The speed error is converted at the digital-analog converter 15 to an analog voltage which in turn is amplified at the servo amplifier 16. The other arrangement is similar to that of the numerical system in FIG. 1. Although only the X-axis arrangement is shown in FIG. 4, the same thing holds true for the Y-axis arrangement and the numerical system in FIG. 4 performs the same operation as the system in FIG. 1. The block in FIG. 4 is identical in its arrangement to a section as indicated by a broken line in FIG. 2 and performs the same operation.

One output XPE of the block 70 corresponds to the output of the position error register 47 in FIG. 2 and the other output $\Delta X_p$ of the block 70 corresponds to the output of the buffer register 14 in FIG. 1. A numerical signal $\Delta Xp$ from the buffer register 14 corresponds to the distance in which the machine tool 13 is moved for the sampling time. This value is increased with the increasing moving speed of the machine tool 13 and decreased with the decreasing moving speed of the machine tool 13 and in consequence it represents a speed data. A coefficient multiplier 71 is adapted to multiply the $\Delta Xp$ data by a constant coefficient to generate an output and a subtractor 72 is adapted to subtract the value $K \cdot \Delta Xp$ from the position error data XPE, the result of which is applied to a digital filter 73. The digital filter 73 is a circuit for stabilizing the servo system and the output of the digital filter 73 is applied to the D-A converter 15. If the block 70, coefficient multiplier 71, subtractor 72 and digital filter 73 are combined into a new controller 11', the speed error representing output signal XDR of the controller 11' is converted at the D-A converter 15 to the analog signal which in turn is amplified to cause the servo motor to be driven. As in this NC system the speed error is used as a transmission data, it is possible to obtain an excellent servo characteristic.

Although in the first and second embodiments each of the controllers 11 and 11' constitutes a wire-connectioned digital circuit, it can be comprised of a suitably programmed general-purpose computer. In this case, a suitable program is prepared by an experienced programmer so as to permit the computer to execute a desired operation. That is, the program is stored through the tape reader 10 into a memory in the computer and the computer is started to calculate based on the program the instruction position data IF read by the tape reader 10, the sampling pulse SP from the sampling pulse generator 12 and the X-axis position data $\Delta Xp$ from the buffer registers 14 and 24. The instruction position increment value corresponding to the sampling time is applied to the D-A converter. The remaining operation is the same as in the above-mentioned embodiment. In this case, a predetermined logic calculation is effected only once for the sampling time ($\Delta T = 1$ms) in the computer and with reliability. In the controller 11' in FIG. 4 a program for serving as the digital filter 73 can be readily incorporated into the computer utilizing a known sampling control theory.

In the NC system in FIG. 1 a position encoder adapted to deliver a digital output representing as an absolute value the range of the X-axis position which can be counted by the reversible counter 20 can be used instead of the position detector 18 and the output of the position encoder be applied to the buffer register 14.

The numerical output of the reversible counter or the position encoder can be inputted for each sampling time directly to the controller 11 instead of dispensing with the buffer register 14 which buffers the content of the reversible counter 20 for each sampling time.

Although the above-mentioned embodiments has been explained in connection with the 2-axis machine tool, this invention can be applied equally to a multi-axis machine tool.

Figure 5:
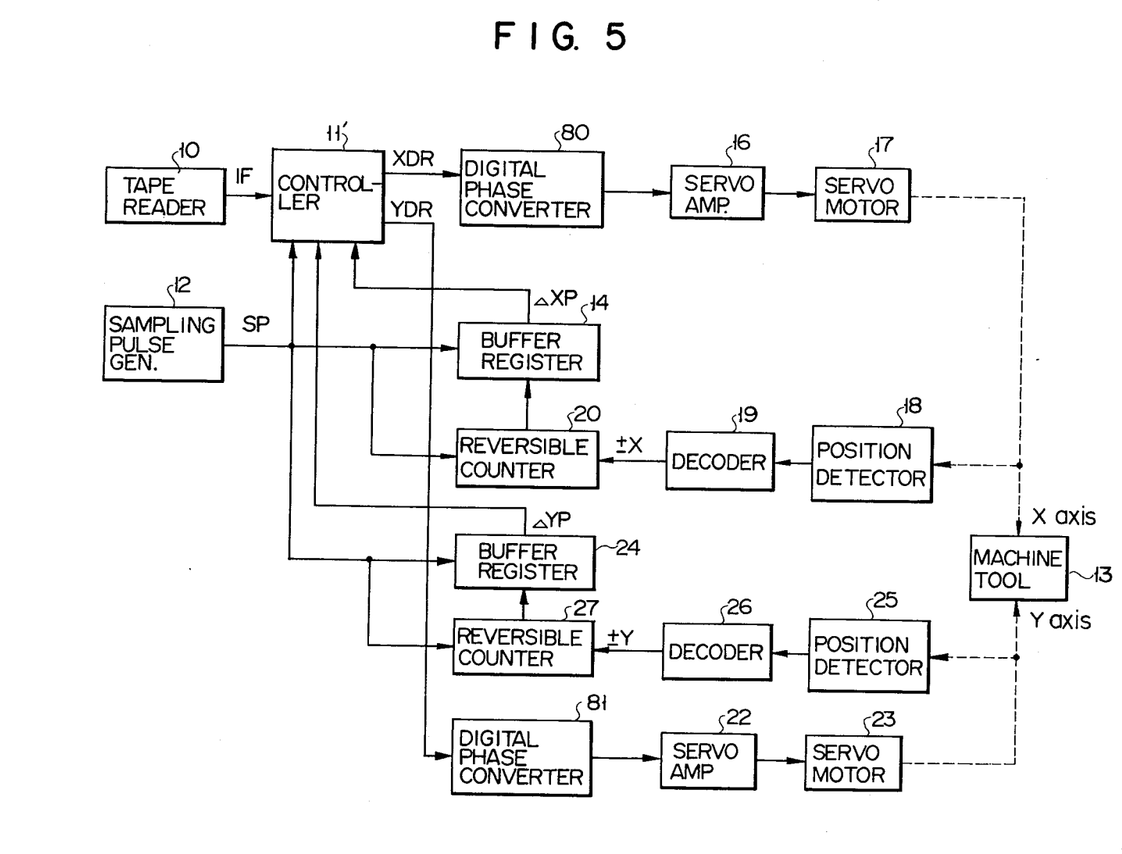
FIG. 5 is a block diagram showing an NC system according to another embodiment of this invention.

FIG. 5 shows an NC system according to another embodiment of this invention. The NC system permits a direct control of a servo amplifier 16 which is provided to drive a servo motor 17. That is, the NC system directly controls the conduction angle of an SCR amplifier which is used as the servo amplifier.

a. The response speed of the SCR amplifier is limited by a commercial power source frequency.

b. The quickest response servo motor now available is of the order of about 100Hz.

With these in view, a servo motor is directly controlled using a sampling time having a sampling time of the order of the commercial power source frequency in an attempt to obtain an excellent servo characteristic. In the arrangement in FIG. 5 the controller 11' in FIG. 4 is used instead of the controller 11 in FIG. 1, and digital phase converters 80 and 81 are used instead of the D-A converters 15, 21 in FIG. 1. The other arrangement is similar to that in FIG. 1. The NC system in FIG. 5 executes the straight instruction, circular arc instruction and positioning instruction.

In the arrangement in FIG. 5, the controller 11' receives, as explained in connection with FIG. 4, the data IF from the tape reader 10, sampling pulse signal SP generated for each sampling time $\Delta T$ from the sampling pulse generator 12 and data $\Delta Xp$ representative of the distance in which the machine tool is moved for each sampling time in the X-axis direction and delivers based on the those data a suitable motor drive data XDR corresponding to the sampding time $\Delta T$. The drive output data XDR of the controller 11' is converted to a phase data and the output data of the digital phase converter 80 controls the current conduction angle of the servo amplifier 16. In consequence, the servo motor 17 is driven at a stable rate of speed according to the output of the servo amplifier.

Figure 6:
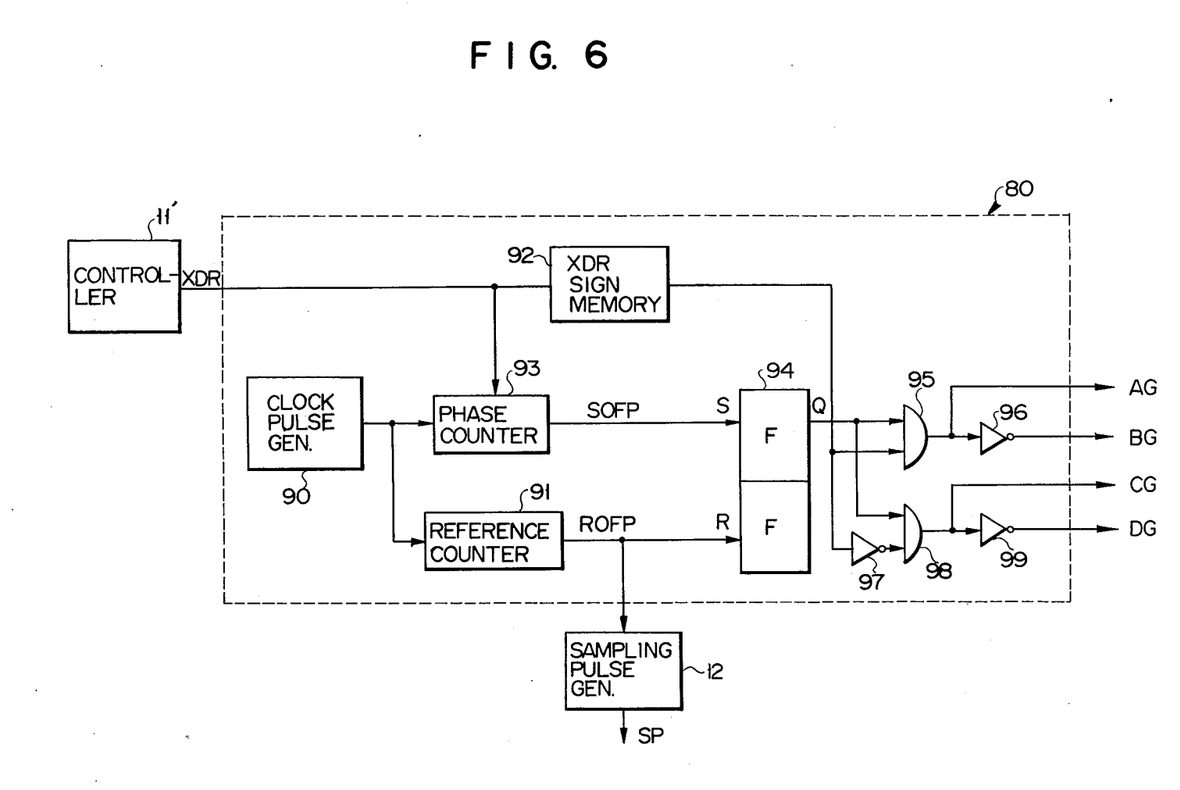
FIG. 6 is a circuit showing a detail of a digital phase converter in FIG. 5.

FIG. 6 shows a detail of the X-axis digital phase converter 80. Where servo amplifier 16 is transistor amplifier, in the Figure, reference numeral 90 shows a clock pulse generator for generating a clock pulse with a predetermined frequency. The clock pulses of the clock pulse generator 90 are counted by a reference counter 91 with a count capacity of 256. Each time 256 clock pulses are counted at the reference counter 91, the reference counter 91 delivers an overflow pulse ROFP which in turn is applied to the sampling pulse generator 12. Since the overflow pulse ROFP is applied to the sampling pulse generator 12, an output pulse SP of the generator 12 is generated at the same timing as the overflow pulse ROFP.

Figure 7:
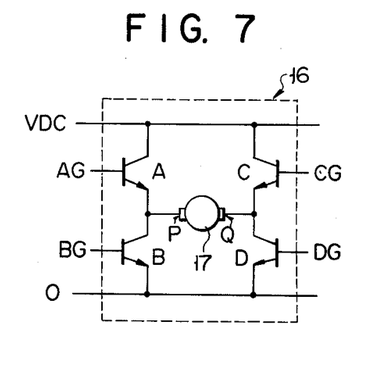
FIG. 7 is a wiring diagram of a transistor servo amplification.

The controller 11' is designed to delivers an output XDR which is restricted to a range of $-255$ to $+255$, and the sign of the output XDR of the controller 11' is stored in an XDR sign memory 92 upon receipt of each sampling pulse SP and the absolute value data of the numeral output XDR is transferred to a phase counter 93 upon receipt of each sampling pulse SP. The phase counter 93 has the same count capacity as the reference counter 91 and after inputting the output data XDR the phase counter 93 has its content increased in increments of one upon receipt of each clock pulse. When the content of the counter 93 exceeds 256 counts, the phase counter 93 delivers an overflow pulse SOFP. In consequence, the phase of the output SOFP varies in proportion to the absolute value of the output XDR from the controller 11'. The XDR sign memory 92 delivers an output of a logic value "1" when the output XDR of the controller 11' is positive and an output of a logic value "0" when the output XDR of the controller 11' is negative. A flip-flop 94 is set by the output pulse SOFP of the phase counter 93 to generate an output of a logic value "1" from the output terminal Q thereof and reset by the output pulse ROFP of the reference counter 91 to generate an output of a logic value "0" from the output terminal Q thereof. The Q output of the flip-flop 94 and the output of the XDR sign memory 92 are ANDed at an AND circuit 95 to generate an AG output signal. The AG output signal becomes a BG output signal, when it passes through an inverter 96. Likewise, the Q output of the flip-flop 94 and the output of the XDR sign memory 92, which is passed through an inverter 97, and ANDed at an AND circuit 98 to generate a CG output signal and the output of the AND circuit 98 becomes a DG output signal when it passed through an inverter 99. From the above it will be evident that the BG signal is an inverted one of the AG signal and the DG signal is an inverted one of the CG signal. When the XDR data of the controller 11' is positive, the CG output signal is fixed to a logical level "0" and when the XDR data of the controller is negative, the AG output signal is fixed to a logical level "0". The output signals AG, BG, CG and DG of the digital converter 80 are applied to the bases of transistors A, B, C and D, as shown in FIG. 7, in the servo amplifier 16. As shown in FIG. 7 the transistor servo amplifier 16 comprises two parallely arranged pairs of transistors connected between a 0 volt line and a VDC volt line with the transistors in each pair arranged in the same direction.

Figure 8:
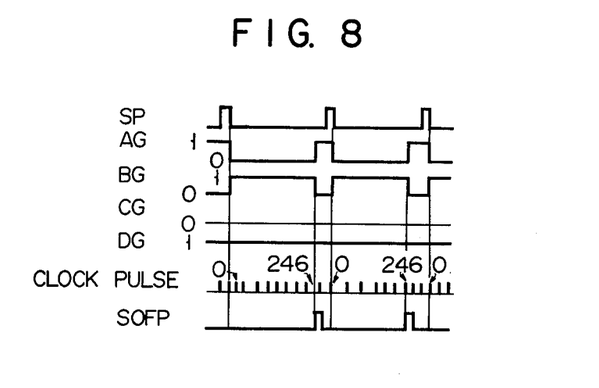
FIG. 8 is a time chart showing each output of the digital phase converter in FIG. 6.

FIG. 8 shows a relation of each output signal of the digital phase converter 80 when the XDR output of the controller 11' is, for example, "+10". Since in this case the XDR output XDR is positive the signal CG is fixed to a logical level "0" and the signal DG to a logical level "1". At this time the controller 11' delivers an XDR output data (=10) to the phase counter 93 upon receipt of the sampling pulse SP and the phase counter 93 continues to count clock pulses of the clock pulse generator 90. When the content of the phase counter reaches 256 counts, that is, 246 (=256−10) clock pulses from the sampling pulse SP are counted, an overflow pulse SOFP is outputted, causing the flip-flop 94 to be set and permitting the AG signal to become a logical level "1" and the BG signal to become a logical level "0". When the next sampling pulse SP is outputted, the flip-flop 94 is reset to cause the AG signal to become a logical level "0" and the BG signal to become a logical level "1". In this way, the output signal AG=1 period is proportional to the numerical XDR data of the controller 11'.

The transistors A, B, C and D in FIG. 7 are rendered ON when the output signals AG, BG, CG and DG of the digital phase converter 80 are at the level "1" and rendered OFF when the output signals AG, BG, CG and DG of the digital phase converter 80 are at the level "0". At the timing as shown in FIG. 8 the transistor A is turned ON during the signal AG=1 period, causing a terminal P of the servo motor 17 to be made at a level of the DC power source voltage VDC. Since at this time a terminal Q of the motor 17 is always at the level of 0, VDC volt and 0 volt rectangular waves are supplied to the motor 17 to cause the latter to be rotated in the normal direction. When the voltage VDC is applied to the motor 17, since the signal AG is propertional to the XDR output of the controller 11', an average DC voltage applied to the motor 17 is in proportion of the XDR output data. When the XDR output data is negative the output signal AG of the digital phase converter 80 is fixed to a logical level "0" and the output signal BG of the dital phase converter 80 to a logical level "1" and consequently the terminal P of the motor 17 is fixed to the voltage level of 0 volt. Since the rectangular voltage wave during the period proportional to the XDR output is applied to the terminal Q of the motor 17 to cause the latter to be rotated in a reverse direction.

Figure 9:
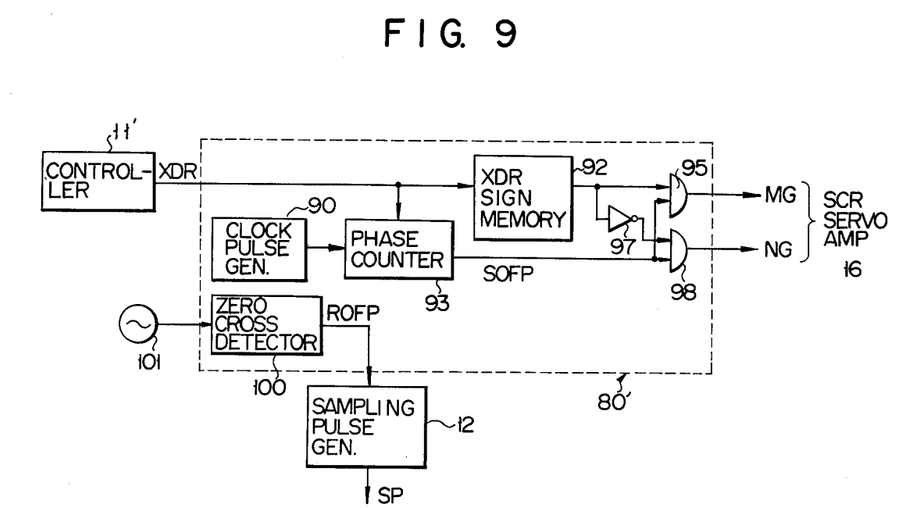
FIG. 9 is a detailed block diagram showing another form of a digital phase converter in FIG. 5.
Figure 10:
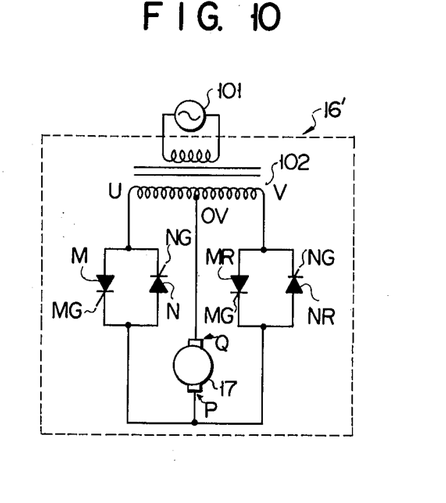
FIG. 10 is a wiring diagrams of an SCR servo amplifier.

Explanation will be made of the case where the servo amplifier 16 in FIG. 5 is a silicon controlled rectifier (SCR) amplifier. A dash line box in FIG. 9 is a detail of an X-axis digital phase converter 80' for the SCR amplifier. In FIG. 9 a zero cross detector 100 delivers a pulse ROFP (a pulse with a frequency two times as large as a commercial frequency), each time the AC voltage of an SCR energizing AC commercial frequency voltage crosses at a level of 0 volt. Since the pulse ROFP is applied to the input of the sampling pulse generator 12, the sampling pulse generator 12 delivers a sampling pulse SP with a frequency two times as large as that of the commercial frequency. The XDR output data of the controller 11' is in a range of −255 to +255 and the sign of the XDR output data is stored in an XDR sign memory 92 upon receipt of each sampling pulse SP. The absolute value of the XDR numerical output data is transferred to a phase counter 93 upon receipt of each sampling pulse SP. The phase counter 93 has a 256-count capacity and increases its content in increments of one upon receipt of each clock pulse. A clock pulse generator 90 generates a clock pulse with a predetermined frequency and the frequency of the clock pulse is set to 512 times as large as that of the SCR energizing commercial frequency power source 101. When the content of the phase counter 93 exceeds the 256 count capacity, it delivers an overflow pulse SOFP. When the output XDR of the controller 11' is positive, since the output of the XDR sign memory 92 is a logical level "1", an AND circuit 95 is AND-controlled at the time the phase counter 93 delivers an overflow pulse SOFP. As a result, the digital phase converter 80' generates an output signal MG. When on the other hand the output XDR of the controller 11' is negative, the output of the XDR sign memory 92 is a logical level "0" and the logical level "0" signal is inverted at an inverter 97 to generate a logical level "1" signal. The logical level "1" signal is applied to an AND circuit 98 and the AND circuit 98 is AND-controlled at the time when the phase counter 93 generates an overflow pulse SOFP. As a result, the digital phase converter 80' delivers an output signal NG. The output signals MG and NG are applied to the gates of the corresponding SCR's 16' in an SCR servo amplifier as shown in FIG. 10. The SCR servo amplifier 16' comprises two serially arranged pairs of SCR's, as shown in FIG. 10, which are connected across the terminals U and V of a secondary winding of a transformer 102 with the SCR's in each pair connected in parallel with each other, a primary winding of the transformer 102 being connected to a commercial frequency voltage 101. A servo motor 17 is connected between a mid-point 0 (0 volt) of the secondary winding of the transformer and a junction between the two serially arranged pairs of SCR's.

Figure 11:
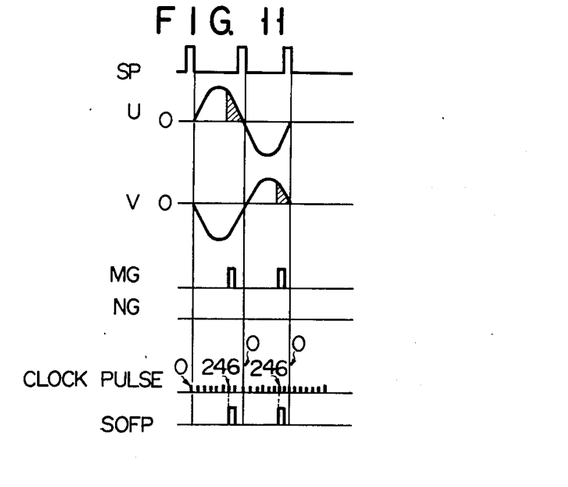
FIG. 11 is a waveform diagram showing a digital phase converter in FIG. 9.

FIG. 11 shows each output waveform of the digital phase converter 80' when the XDR output of the controller 11' is "+10" for example. After the XDR output data "+10" of the controller 11' is outputted at the timing of the sampling pulse SP into the phase counter 93, the phase counter 93 sequentially counts clock pulses from the clock pulse generator 90 and when 246 clock pulses from the sampling pulse SP are counted, the phase counter 93 delivers an overflow pulse SOFP. The converter 80' delivers a pulse signal MG at the time the SOFP pulse is generated. The pulse signal MG fires, the SCR-M, to the anode of which is applied a positive potential U. As a result, the hatched portion of a voltage U in FIG. 11 is applied to the terminal P of the servo motor 17. At the next sampling time, to the anode of which is applied a positive potential V. As a result, the hatched portion of a voltage V in FIG. 11 is applied to the terminal P of the servo motor 17 and the terminal P of the motor 17 is made positive with respect to the terminal Q (to which is always applied a voltage of 0 volt) of the motor 17 to cause the motor 17 to be rotated in the normal direction. Since the conduction angle of the SCR is in proportion to the XDR output data, the motor speed is controlled by the XDR output data. When the XDR output data is negative, the digital phase converter 80' delivers an NG pulse to cause the SCR-N and SCR-NR to be fixed to permit the motor 17 to be rotated in the reverse direction.

The NC system according to this invention can be applied to a servo amplifier such as the above-mentioned transistors amplifier, SCR amplifier etc., in which the conduction angle of electric current applied to the motor is controlled by the phase angle.

This invention is not restricted to the above-mentioned embodiment and various changes and modifications can be made without departing from the spirit and scope of this invention.

What is claimed is:

1. A numerical control system comprising a plurality of axially movable sections; a numerical data source for instructing a predetermined movement path of the movable section; a sampling pulse generator for generating a sampling pulse for every predetermined time period; position detecting means for detecting the amount and direction of movement of the movable section for the predetermined time period to generate a position data; a controller adapted to calculate an instruction position increment value of the movable section to be moved for the predetermined time period based on said numerical data and said sampling pulse from said sampling pulse generator, a position error memory section in the controller in which each calculated increment value is cumulatively added and each output from said position means is cumulatively subtracted; converter means for converting the numerical data from said position error memory section to an analog data; amplifier means for amplifying said analog data from said converter means; and a servo motor driven according to the output of said amplifier means.

2. A numerical control system according to claim 1, in which said controller includes a circuit for deriving an instruction position increment value for each sampling time corresponding to a circular arc instruction, said circuit including a calculation unit for calculating for each sampling time the circular arc position increment value as started from a starting point of the circular arc and an addition-subtraction register for effecting the addition and subtraction of the circular arc position increment value from the calculation unit with respect to a straight line instruction increment value stored for each sampling time.

3. A numerical control system according to claim 1, in which said controller includes a fractional part processing circuit for carrying the instruction position increment value for each sampling time as an instruction position increment value associated with an integral part only; a final sampling processing circuit for outputting at a final sampling time an instruction position increment value coincdent with a final position instruction data; and a position error circuit for delivering an output indicative of a position error difference between a cumulative value of each instruction position increment value for the sampling time and a cumulative value of an actual movement position data for each sampling time of the movable section.

4. A numerical control system according to claim 1, in which said controller is comprised of a general-purpose computer.

5. A numerical control system comprising a plurality of axially movable sections; a numerical data source for instructing a predetermined movement path of the movable section; a sampling pulse generator for generating a sampling pulse for a predetermined time period; position detecting means for detecting the amount and direction of movement of the movable section for the predetermined time period to generate a position data; a controller adapted to calculate an instruction position increment value corresponding to a desired amount of movement of the movable section for each predetermined time period based on said numerical data and said sampling pulse from said sampling pulse generator, and deliver a motor drive data corresponding to a position error between a cumulative value of the instruction position increment value for the predetermined time period and a position data of the movable section as detected at said position detecting means for the predetermined time period; a digital phase converter adapted to receive the motor drive data of said controller and deliver an output as a phase varying data for the predetermined time period; a servo amplifier for controlling a conduction angle for the predetermined time; a servo motor driven by said servo amplifier and control means for controlling the conduction angle of said servo amplifier by the output of said digital phase converter.

6. A numerical control system according to claim 5, in which said controller includes a coefficient multiplier for multiplying by a predetermined constant the position distance for each predetermined time period of the movable section as detected by said position detecting means; subtracting means for subtracting from an output data of said coefficient multiplier a position error data between the instruction position increment value for the predetermined time period and the position data of the movable section as detected by said position detecting means; and digital filter means provided for the stabilization of a servo system and adapted to filter a digital output data from said subtractor means.

7. A numerical control system according to claim 5, in which said digital phase converter includes sign storing means for converting a servo drive data for each predetermined time period from said controller to a phase data proportional to said servo drive data and detecting a positive or a negative sign of said servo drive data to store it; a clock pulse generator for generating a clock pulse for the predetermined time period; a phase counter adapted to count each clock pulse from said clock pulse generator and, when a predetermined number of counts are counted, deliver an output control means for controlling the pulse generation of said sampling pulse generator; and logic circuit means for receiving the outputs of said sign storing means and said phase converter and forming a servo amplifier control pulse according to a servo drive data of said controller.

8. A numerical control system according to claim 7, in which said control means includes a reference counter for counting a predetermined number of clock pulses from said pulse generator.

9. A numerical control system according to claim 7, in which said control means includes a zero cross detector for delivering a detection pulse each time a zero potential of a commercial frequency power source is detected.

10. A numerical control system according to claim 5, in which said servo amplifier includes a transistor for driving the servo motor in a mormal direction and a transisor for driving the servo motor in a reverse direction.

11. A numerical control system according to claim 5, in which said servo amplifier includes a combination of silicon control rectifiers, one of which drives the servo motor in a normal direction and the other of which drives the servo reverse direction, the conduction angle of the silicon control rectifier being controlled according to a phase data proportional to the servo drive data of said controller which is applied to the gate of the silicon control rectifier.

* * * * *